(12) United States Patent
Coerlin et al.

(10) Patent No.: US 7,014,936 B2
(45) Date of Patent: Mar. 21, 2006

(54) FUEL CELL BLOCK

(75) Inventors: Detlev Coerlin, Erlangen (DE); Arno Mattejat, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 404 days.

(21) Appl. No.: 10/218,943

(22) Filed: Aug. 14, 2002

(65) Prior Publication Data

US 2004/0033409 A1   Feb. 19, 2004

(30) Foreign Application Priority Data

Feb. 14, 2000 (DE) ............................... 100 06 472

(51) Int. Cl.
 *H01M 8/04* (2006.01)
(52) U.S. Cl. .............................. 429/34; 429/26; 429/32
(58) Field of Classification Search ..................... None
 See application file for complete search history.

(56) References Cited

U.S. PATENT DOCUMENTS

| | | | |
|---|---|---|---|
| 3,392,058 A | 7/1968 | Harrison et al. | |
| 4,002,493 A | 1/1977 | Warszawski | |
| 5,064,732 A * | 11/1991 | Meyer | 429/13 |
| 6,458,478 B1 * | 10/2002 | Wang et al. | 429/17 |
| 6,787,254 B1 * | 9/2004 | Cargnelli et al. | 429/13 |

FOREIGN PATENT DOCUMENTS

| | | |
|---|---|---|
| DE | 198 09 575 A1 | 9/1998 |
| JP | 58005979 | 1/1983 |
| JP | 62229768 | 10/1987 |
| JP | 63195971 | 8/1988 |
| JP | 05166528 | 7/1993 |
| JP | 06068886 | 3/1994 |
| JP | 08195212 | 7/1996 |
| JP | 10172593 | 6/1998 |
| JP | 10312821 | 11/1998 |

* cited by examiner

*Primary Examiner*—John S. Maples
(74) *Attorney, Agent, or Firm*—Laurence A. Greenberg; Werner H. Stemer; Ralph E. Locher

(57) ABSTRACT

In fuel cells operated with damp operating gases, water condenses out as the operating gas flows from the damping device to the fuel cell block. Typically, the condensed water runs into the fuel cells and impairs their operation. A fuel cell block according to the invention includes fuel cells, a an operating gas delivery line, and a condensed water separator connected to the operating gas delivery line for preventing the condensed water from flowing into the fuel cells.

22 Claims, 3 Drawing Sheets

FUEL CELL BLOCK

BACKGROUND OF THE INVENTION

Field of the Invention

The invention relates to a fuel cell block including a number of fuel cells in a fuel cell stack and an operating gas feed line. During the electrolysis of water, the water molecules are broken down into hydrogen ($H_2$) and oxygen ($O_2$) by electric current. In a fuel cell, inter alia, such a process takes place in the reverse direction. Electrochemical bonding of hydrogen and oxygen to form water generates electric current with a high level of efficiency and, if pure hydrogen is used as the fuel gas, without any emissions of pollutants and carbon dioxide ($CO_2$). Even with a technical grade fuel gas, for example, natural gas or coal gas and with air instead of pure oxygen, in which the air may additionally be enriched with oxygen, a fuel cell generates considerably fewer pollutants and less carbon dioxide than other energy generators that operate with fossil energy carriers.

Industrial implementation of the principle of the fuel cell has led to different solutions, specifically, with various types of electrolyte and with operating temperatures of between 80° C. and 1000° C. Fuel cells are divided into low-temperature, medium-temperature, and high-temperature fuel cells depending on their operating temperature, and these classes can, in turn, be distinguished from one another by various technical embodiments.

A single fuel cell supplies an operating voltage of at most 1.1 volts. Therefore, a multiplicity of fuel cells are stacked on top of one another and combined to form a fuel cell block. In the specialist literature, such a block is also referred to as a stack. Connecting the fuel cells of the fuel cell block in series allows the operating voltage of a fuel cell system to amount to a few hundred volts.

In a fuel cell block, various components are stacked in an alternating sequence on top of one another. Examples of such components include an electrolyte electrode assembly and a bipolar plate. Depending on the embodiment of the fuel cell block, there may be further components, such as, for example, pressure cushions, electrically conductive layers, or seals, between an electrolyte electrode assembly and a bipolar plate. Depending on the type of fuel cells, the bipolar plate is configured, for example, as a composite conductor plate or as a temperature-control element that includes two stacked plates with a cooling or heating water chamber between them.

While they are operating, the fuel cells of a fuel cell block are supplied with operating gases, i.e., hydrogen-containing gas and oxygen-containing gas. Some embodiments of low-temperature fuel cells, in particular, fuel cells with polymer electrolyte membranes (PEM fuel cells), require humidified operating gases to operate. In a suitable device, such as, for example, a liquid ring compressor or other humidifiers, these operating gases are heated to the temperature of the fuel cell block and are saturated with steam.

If the operating gases are passed through long operating gas feed lines from the humidifier to the fuel cell block, in this way the temperature of a humidified operating gas may fall as a result of heat loss to the environment, leading to the condensation of water. In the case of large mass flow rates, long lines and large surface areas of the lines, as is the case, for example, in fuel cell blocks that are operated with air as oxygen-containing operating gas, considerable quantities of liquid water may form in this way. The water is transported to the fuel cell block with the operating gas and, preferably, runs into the cells disposed at the front, as seen in the direction of flow of the operating gas. Given a sufficiently large quantity, the water can impede gas exchange and, therefore, the electrochemical bonding of hydrogen and oxygen in these cells and may, therefore, have an adverse effect on the performance of these cells.

In fuel cell systems that are integrated in vehicles, it is not always possible for the humidifier and the fuel cell block to be disposed so close together that no condensation or only a negligible amount of condensation is formed. The installation conditions are generally predetermined. The components of the fuel cell system, i.e., humidifiers and one or more fuel cell blocks, have to be distributed in the available installation space such that boundary conditions, such as weight distribution in the vehicle, installation and removal space, and accessibility for maintenance have to be taken into account. Therefore, there may be a conflict of interest that may throw doubt on the ability of the fuel cell system to function.

SUMMARY OF THE INVENTION

It is accordingly an object of the invention to provide a fuel cell block that overcomes the hereinafore-mentioned disadvantages of the heretofore-known devices of this general type and that does not have condensation impair the function of the fuel cells.

With the foregoing and other objects in view, there is provided, in accordance with the invention, a fuel cell block, including fuel cells disposed in a fuel cell stack, an operating gas feed line, and a plate-shaped component having a condensation separator fluidically connected to the operating gas feed line, the component being integrated in the fuel cell stack. The condensation separator branches off from the operating gas feed line.

The invention is based on the consideration that, given a long operating gas feed line from the humidifier to the fuel cell block, the condensation of water from the operating gas can only be prevented with considerable outlay, for example, by thermal insulation and heating of the relevant lines. To not reduce the efficiency of the fuel cell block, such a solution cannot be considered. A more favorable solution is to discharge the condensation, achieved particularly easily by a condensation discharge line that branches off from the operating gas feed line between the humidifier and the fuel cell block.

However, such a solution entails the drawback that the fuel cell system, of which the fuel cell block forms part, has a further line. Because a fuel cell system in a vehicle has to be accommodated within an extremely tight space and such a system includes a multiplicity of pipes, hoses, connecting elements, and valves, each additional line represents a not inconsiderable drawback.

Therefore, the invention is based on the further consideration that the integration of the condensation discharge line in the fuel cell block avoids the drawback of an additional line. The condensation discharge line is, for example, part of a condensation separator that, in addition to the condensation discharge line, also includes further elements. However, the condensation separator may also be formed by the condensation discharge line alone. A condensation separator that is so constructed as part of the fuel cell block entails the further advantage that it is connected to a location of the operating gas feed line at which the operating gas line is at the temperature of the fuel cell block. In such a context, the term "connected" means that the condensation separator is joined to the operating gas feed line such that the condensation can flow from the operating gas feed line into the condensation separator. The operating gas feed line is fluidically connected to at least one of the fuel cells.

As the fuel gas feed line carries on to the individual fuel cells, the operating gas feed line remains at the constant temperature of the fuel cell block, and, consequently, there is no further condensation of water out of the humidified operating gas. The configuration ensures that the condensation separator separates the entire quantity of the condensation out of the operating gas and it is substantially impossible for any condensation to enter the fuel cells. The configuration effectively prevents the function of the fuel cells from being impaired by condensation.

The separation of the condensation out of the operating gas feed line takes place, for example, such that the condensation discharge line receives the condensation from the operating gas feed line in the manner of a drain in a roadway or street. The condensation is passed through the condensation discharge line, if appropriate is temporarily stored in a condensation collection chamber of the condensation separator, and is then passed onward out of the condensation separator.

In accordance with another feature of the invention, the condensation discharge line is disposed in a plate-like component, and the component is integrated in the fuel cell stack. A fuel cell block has a multiplicity of plate-like components. Such plate-like components accommodate operating gas chambers in which the operating gases are able to flow along the electrolyte electrode assembly, one or more cooling water chambers, and a multiplicity of passages for supplying and discharging operating gases and cooling water. Without major difficulty, such a passage and/or space within a plate-like component can be reconfigured such that the passage and/or chamber function as a condensation separator. It is preferable to use passages and/or chambers that in normal operation of the fuel cell block otherwise have no function.

Consequently, no additional plate-like or other component is required within the fuel cell block for the configuration of the condensation separator. Therefore, neither the complexity of the fuel cell system nor the volume of the fuel cell block is increased.

In accordance with a further feature of the invention, the component is advantageously a connection plate of the fuel cell block. The connection plate delimits the fuel cell stack of the fuel cell block and is provided with connections for supplying the fuel cell stack with operating gas and cooling or heating water. The operating gas feed line runs from the humidifier to the fuel cell block, through the connection plate to the individual fuel cells. Integration of the condensation separator in the connection plate can be carried out without significantly increasing the volume of the fuel cell block. With similar advantages, the condensation separator can also be integrated in a separating plate that separates two regions of the fuel cell block from one another.

In accordance with an added feature of the invention, the condensation separator runs along a thermal component. A thermal component is a heating or cooling component and is used to control the temperature within the fuel cell block. In standard fuel cells, the thermal component is adjoined by those gas chambers through which the operating gases flow while the fuel cells are operating, and they flow along the electrolyte electrode assembly. The first thermal component, as seen in the stacking direction of the fuel cell stack, is adjoined by a gas chamber that is not adjoined by any electrolyte electrode assembly. It is expedient for no operating gas to flow through such a gas chamber because the absence of the electrolyte electrode assembly means that it cannot undergo any electrochemical reaction. The gas chamber, therefore, has no function. Consequently, such a gas chamber, with its connections to the operating gas feed line, can be used as a condensation separator without any loss in performance of the fuel cell block. In such a configuration, the condensation flows through a similar path to the operating gas in the adjacent fuel cell. The condensation separator is expediently connected to the operating gas feed line upstream of the first fuel cell, as seen in the direction of flow of the operating gas. A condensation separator so disposed ensures that the condensation that has condensed in the operating gas feed line between the humidifier and the fuel cell block cannot pass into the first fuel cell, but, rather, is collected by the condensation separator on the way to the first fuel cell.

In accordance with an additional feature of the invention, the condensation separator includes a gas block. A condensation separator configured without a gas block has the drawback that a certain quantity of operating gas passes not into the fuel cells but, rather, through the condensation separator and through the fuel cell block. A gas block in the condensation separator prevents or reduces such a parasitic gas stream flowing through the condensation separator. The gas block may be an active gas block or a passive gas block.

A suitable active gas block is a valve that is disposed in the condensation separator and only allows condensation to pass through in the open position. In the closed position, the valve causes the condensation to build up above the valve. When the fuel cell block is operating, the valve is opened and closed periodically, and, consequently, the condensation is only discharged in portions. If the amount of condensation allowed through the valve is only such that a residue of condensation remains above the valve, a parasitic gas stream is effectively prevented from flowing through the condensation separator. A sensor can record the quantity of condensation above the valve.

An example of a suitable passive gas block is a constriction within the condensation separator, a screen, or a filter. Such a gas block reduces the parasitic gas flow. The gas flow can be set to a defined level by the type of screen, filter, or constriction. The parasitic gas stream can also be used beneficially because it forces the condensation to continue on its predetermined path. Such a gastight, passive gas block is, for example, a bend. In such a bend, as is to be found in any washbasin siphon, an S-shaped configuration of a water line means that there is always a certain quantity of water present. Such water closes off the condensation separator in a gastight manner and, therefore, prevents operating gas from flowing through the condensation separator.

In accordance with yet another feature of the invention, a further advantage is provided as a result of the condensation separator being connected to a water collection vessel. The outlet of the condensation separator, therefore, opens out into a line that leads to the water collection vessel or directly into the collection vessel. Such a water collection vessel is in any case present in a fuel cell system that operates with humidified operating gases. It is used to return and temporarily store the product water formed in the fuel cells. The water collection vessel is generally connected to the humidifier, which passes the product water back into the fuel cells as humidification. As a result, the condensation is also collected in the water collection vessel and is, once again, made available to the fuel cells for humidification purposes.

In accordance with yet a further feature of the invention, the condensation separator is connected to an operating gas discharge line. The condensation separator, therefore, connects an operating gas feed line to an operating gas discharge line and passes the condensation out of the operating gas feed line directly into an operating gas discharge line, through which the condensation is passed back out of the fuel cell block. While the fuel cells are operating, water is formed in the fuel cells by the electrochemical reaction of hydrogen and oxygen. Such water is removed from the fuel cell block through the operating gas discharge line together with the operating. gas that flows through the fuel cells without reacting. The condensation from the condensation separator is added to this flow of water. With such a configuration of the invention, there is no need for any passages or lines from the condensation separator to a water collection vessel. Such a configuration simplifies the structure and reduces the volume of the fuel cell block.

In accordance with yet an added feature of the invention, a condensation barrier is expediently disposed in the operating gas feed line. Such a barrier ensures that the condensation that flows in the operating gas feed line does not flow past the opening of the condensation discharge line of the condensation separator and onward into the fuel cells. The condensation barrier is configured, for example, as a threshold in the operating gas feed line that blocks the flow of condensation. Within the fuel cell block, the operating gas feed line is formed by openings in the plate-like elements of the fuel cell block. Narrowing the opening in an element compared to the openings of the adjacent elements results in the formation of a threshold that acts as a condensation barrier. The condensation is stopped from flowing further through the fuel gas feed line in this manner, which can be achieved by simple structural measures.

In accordance with yet an additional feature of the invention, the condensation barrier is disposed between the condensation separator and the first fuel cell.

Alternatively, a metal sheet of a thermal component forms the condensation barrier. A thermal component generally includes two metal sheets that have been joined together and between them form a heating or cooling water chamber. One or both of these metal sheets may be guided such that they project into the operating gas feed line and, thus, form the condensation barrier. In a similar manner to a barrier wall, they prevent the condensation from flowing onward through the operating-medium feed line. The condensation barrier is expediently disposed between the connection of the condensation separator to the operating-medium feed line and the following fuel cell, as seen in the direction of flow of the operating gas. The condensation is forced into the fuel cell block together with the operating-gas stream. With a condensation barrier directly behind the opening of the condensation separator into the operating-gas feed line—or at least still upstream of the next fuel cell, as seen in the direction of flow—the condensation that has passed the opening is blocked and accumulated. The condensation then flows back into the opening. Such a configuration effectively prevents the condensation from flowing past the condensation separator and into the following fuel cell.

In accordance with a concomitant feature of the invention, a further advantage can be achieved if the fuel cells are PEM fuel cells. PEM fuel cells are operated at a low operating temperature of approximately 80° C., and have a favorable overload characteristic and high service life. Moreover, they have a favorable performance in the event of rapid load changes and can be operated with air and also with pure oxygen. All these properties make PEM fuel cells particularly suitable for use in the mobile sector, for example, for driving a very wide range of vehicles.

Other features that are considered as characteristic for the invention are set forth in the appended claims.

Although the invention is illustrated and described herein as embodied in a fuel cell block, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
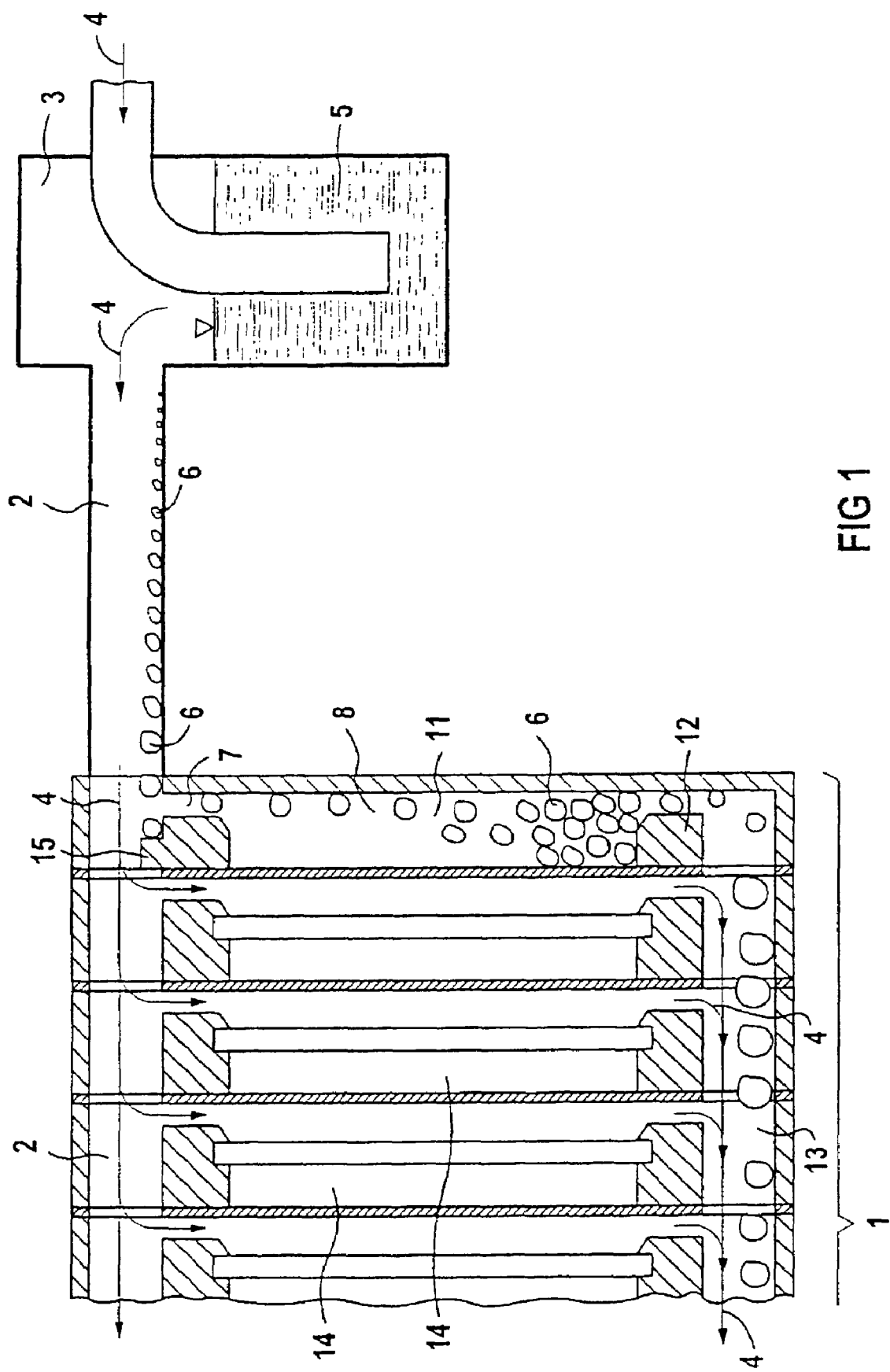
FIG. 1 is a fragmentary, cross-sectional view of a fuel cell block according to the invention.

Referring now to the figures of the drawings in detail and first, particularly to FIG. 1 thereof, there is shown a fuel cell block 1, an operating gas feed line 2 connected thereto, and a humidifier 3. While the fuel cell block 1 is operating, operating gas 4, for example, air or hydrogen-containing ($H_2$) gas, flows into the humidifier 3. The humidifier 3 is filled with water 5 up to a predetermined level. In the humidifier 3, the operating gas 4 is heated and is humidified with water until saturation point. The operating gas 4 then flows out of the humidifier 3 into the operating gas feed line 2. While it is flowing through the operating gas feed line 2, the operating gas 4 cools, with the result that condensation 6 condenses out of the operating gas 4.

The gas stream of the operating gas 4 forces the condensation 6 toward the fuel cell block 1. When it has reached the fuel cell block 1, the condensation 6 runs from the operating gas feed line 2 through the condensation discharge line 7 into a condensation separator 8. The condensation 6 collects in a collection chamber 11 of the condensation separator 8. A gas block 12 is disposed below the collection chamber 11. The gas block 12 of the condensation separator 8 ensures that only a small quantity of condensation 6 can leave the collection chamber 11 of the condensation separator 8 per unit time. Such flow is achieved as a result of the gas block 12 constricting the collection chamber 11 at its lower end such that only a narrow opening remains for leaving the collection chamber 11. The opening additionally allows a small operating gas stream through in addition to the condensation. However, the dimensions of the opening may also be such that the condensation 6 collects at the lower region of the collection chamber 11 so that this lower region is filled with condensation 6. In such a case, no operating gas 4 flows through the condensation separator 8.

Alternatively, the cross-section of the condensation discharge line 7 may be selected such that it simultaneously also serves as a gas block. Regardless of where the gas block 12 is located in the condensation separator, there is no need to control the level of the condensation 6 in the collection chamber 11. The condensation separator 8 is located in a connection plate of the fuel cell block 1, to which, inter alia, the part of the operating gas feed line 2 at the fuel cell block 1 that is located outside the fuel cell block is also connected.

As seen in the direction of flow of the operating gas 4, the condensation separator 8 is connected to the operating gas feed line 2 upstream of the first fuel cell 14 by the condensation discharge line 7. Together with the condensation barrier 15, which is disposed between the connection of the condensation separator 8 and the following fuel cell 14, as seen in the direction of flow of the operating gas 4, it prevents condensation 6 that is condensed in the operating gas feed line 2 from passing into the fuel cells 14.

The condensation separator 8 is connected to an operating gas discharge line 13, through which the operating gas 4 leaves the fuel cell block 1 after it has emerged from the fuel cells 14. Therefore, the condensation 6 is passed to the operating gas discharge line 13 and is connected to the product water that has been formed by the electrochemical reaction of the operating gases 4 in the fuel cells 14. The pressure difference that is in any case present between the operating gas feed line 2 and the operating gas discharge line 13 is used to convey the condensation 6 through the condensation separator 8. The operating gas 4 flowing through the condensation separator 8 assists such a conveying operation.

In the region of the fuel cell block 1, the operating gas feed line 2 is configured as an axial passage that runs parallel to the stacking direction of the fuel cells 14, i.e., parallel to the axis of the fuel cell block 1. There, the operating gas feed line 2 is formed by openings in the plate-like components of the fuel cell block 1. There is a condensation barrier 15 in the operating gas feed line 2. It prevents the condensation 6 from being blown over the opening 7 by the flow of the operating gas 4 so that the condensation reaches the subsequent fuel cells 14. The condensation barrier 15 is configured as a threshold that causes the condensation 6 to build up in the operating gas feed line 2.

Figure 2:
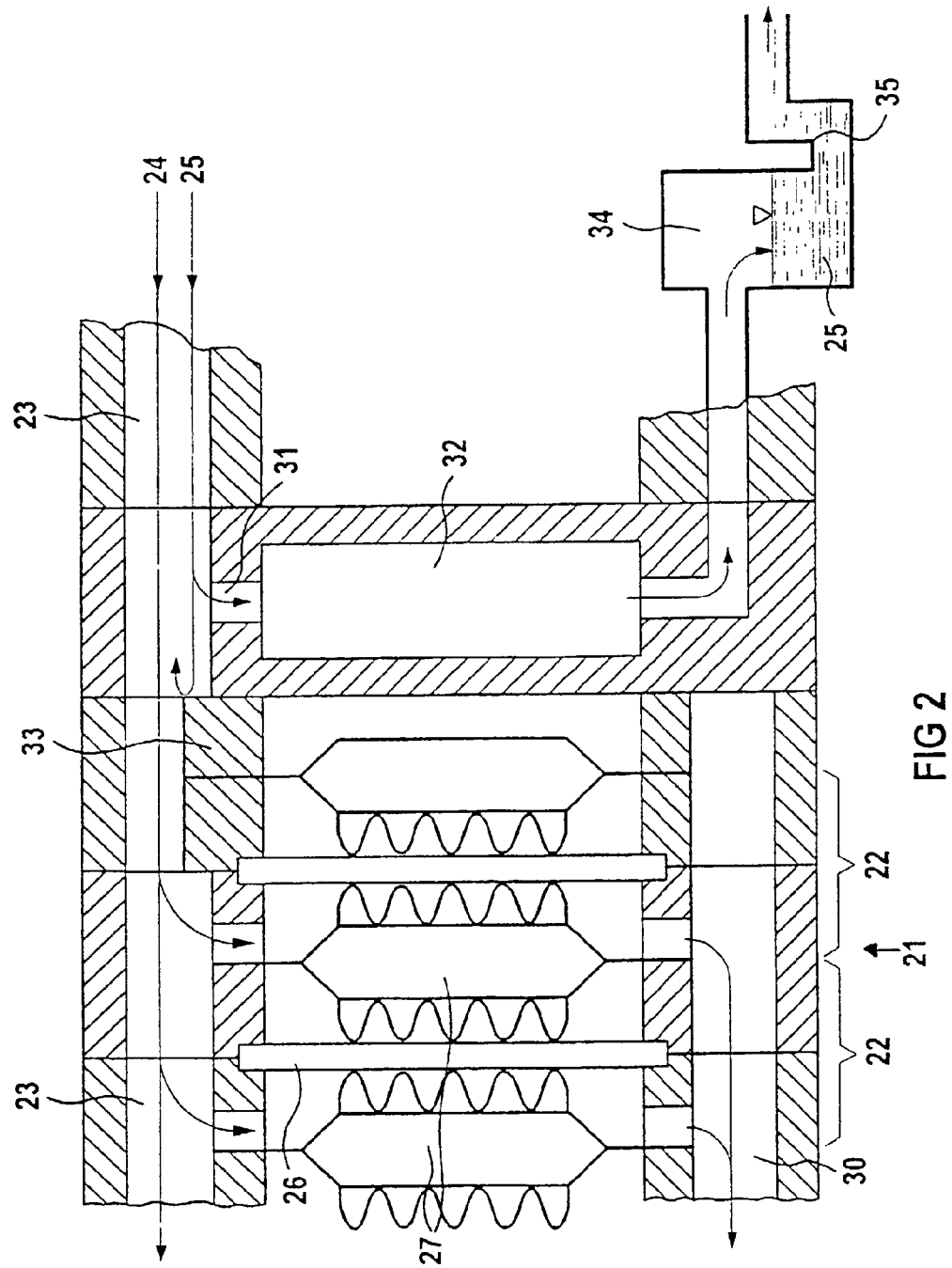
FIG. 2 is a fragmentary, cross-sectional view of an alternative embodiment of the fuel cell block of FIG. 1.

FIG. 2 shows a diagrammatic sectional illustration of a fuel cell block 21 that includes a number of fuel cells 22 in a fuel cell stack and an operating gas feed line 23. The fuel cell block is configured for operation with air that is enriched to saturation point with water in a non-illustrated liquid ring compressor. Some of the water condenses in the operating gas feed line 23 and passes as condensation 25 into the fuel cell block 21.

The air 24 flows from the liquid ring compressor through the operating gas feed line 23 into the individual fuel cells 22, which each have an electrolyte electrode assembly 26 with thermal components 27 adjoining on both sides. The thermal components 27 are used to cool or heat the fuel cells 22. After it has flowed through the fuel cells 22, the air flows through an operating gas discharge line 30 and out of the fuel cell block 21.

The condensation 25 that has been forced into the fuel cell block 21 with the air 24 flows through the operating gas feed line 23 and is, for the most part, collected by the condensation discharge line 31. However, some of the condensation 25 flows past the opening or over it and onward toward the fuel cells 22. However, the condensation 25 is kept away from the fuel cells 22 by a condensation barrier 33. The condensation barrier 33 is configured as a constriction in the operating gas feed line 23 that blocks the condensation 25 in the manner of a threshold. The condensation 25 flows into the condensation separator 32, which is disposed in a separating plate of the fuel cell block 21, and, from there, onward into s a water collection vessel 34 connected to the condensation separator 32. The water collection vessel 34 has a gas block 35 in the form of a bend that prevents parasitic operating gas from flowing through the condensation water separator 32.

Figure 3:
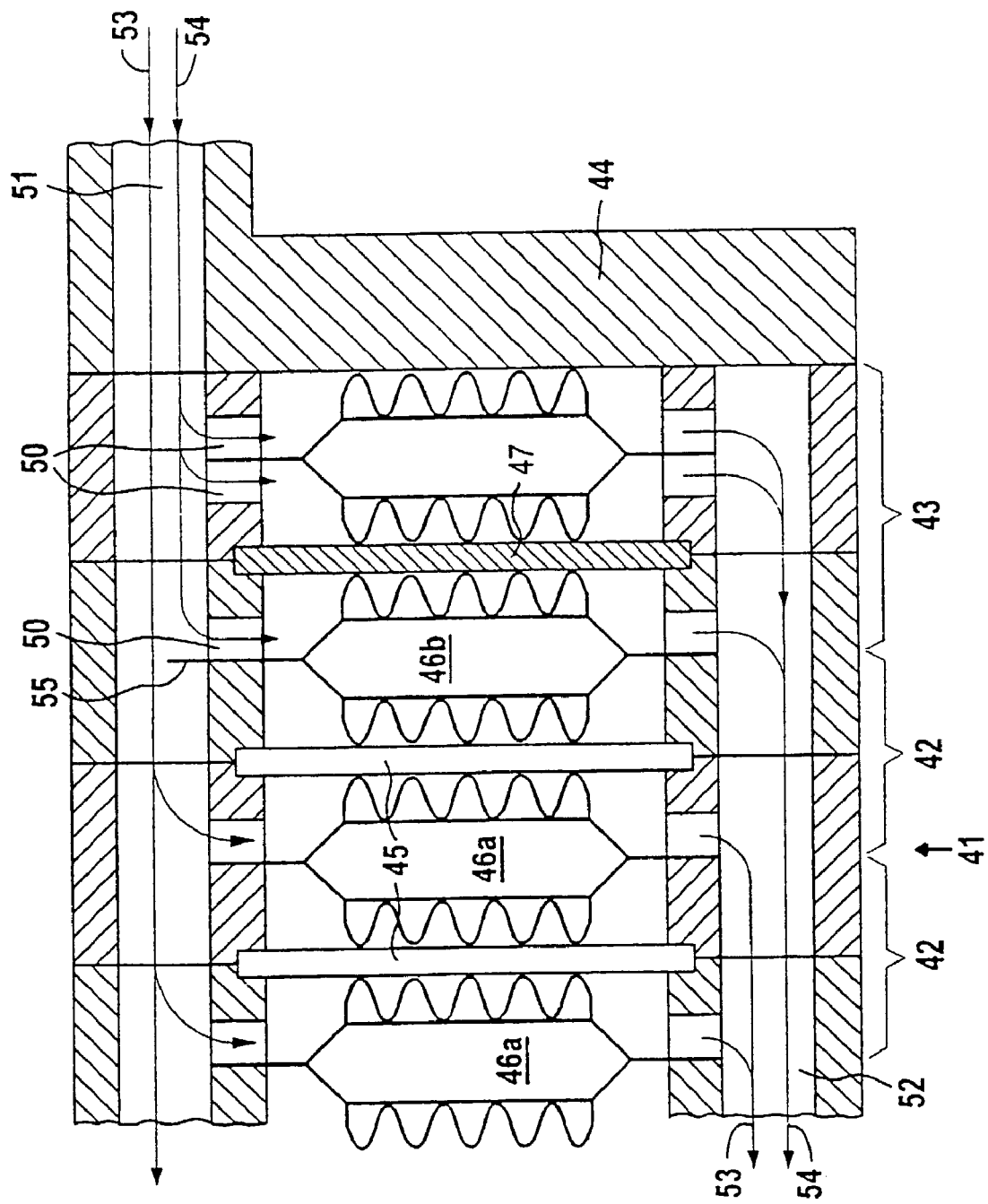
FIG. 3 is a fragmentary, cross-sectional view of a third embodiment of the fuel cell block of FIG. 1.

The fuel cell block 41 that is illustrated in a diagrammatic sectional drawing in FIG. 3 includes a stack of fuel cells 42, only two of which are shown, a condensation separator 43, which is disposed between the fuel cell stack, and a connection plate 44. The fuel cells 42 each include an electrolyte electrode assembly 45, the electrolyte of which is a polymer electrolyte membrane. The fuel cells 42 are PEM fuel cells. Moreover, the fuel cells 42 include a thermal component 46a, 46b on each of the two sides of the electrolyte electrode assembly. The thermal components 46a are configured as cooling components, and the thermal components 46b are configured as cooling and/or heating components that are configured for both cooling and heating. The condensation separator 43 includes a support element 47 with thermal components 46b disposed on both sides. The condensation separator 43, therefore, runs along two thermal components. It is connected to the operating gas feed line 51 by the condensation discharge line 50. Moreover, the condensation separator 43 is connected to an operating gas discharge line 52.

While the fuel cell block 41 is operating, operating gas 53 that has been humidified with water and is in the form of hydrogen ($H_2$), oxygen ($O_2$), or air flows through the operating gas feed line 51 into the fuel cell block 41. The operating gas 53 entrains condensation 54, which likewise passes through the operating gas feed line.51 into the fuel cell block 41. The condensation 54 is collected by the condensation discharge line 50 of the condensation separator 43, flows along the thermal components 46b through the condensation separator 43 and, as it continues to flow, is passed into the operating gas discharge line 52. One of the thermal components 46b has an elongated metal sheet 55 that prevents the condensation 54 from flowing past the condensation discharge line 50 and passing into the fuel cells 42. The metal sheet 55 projects—in a similar manner to a blocking wall—into the operating gas feed line 51, which is configured as an axial passage, and, in this way, blocks the rear part of the fuel cell block 41, as seen in the direction of flow, with respect to the condensation 54. Such a configuration ensures that the functioning of the fuel cells 42 is not impaired by condensation.

We claim:

1. A fuel cell block, comprising:
   fuel cells disposed in a fuel cell stack;
   an operating gas feed line;
   a plate-shaped component having a condensation separator fluidically connected to said operating gas feed line for removing condensation from said operating gas feed line before the condensation passes into said fuel cells, said component being integrated in said fuel cell stack and a condensation barrier disposed between said condensation separator and at least one of said fuel cells.

2. The fuel cell block according to claim 1, wherein said component is a connection plate.

3. The fuel cell block according to claim 1, wherein:
   at least one of said fuel cells has a thermal component; and said condensation separator runs along said thermal component.

4. The fuel cell block according to claim 2, wherein:
   at least one of said fuel cells has a thermal component; and
   said condensation separator runs along said thermal component.

5. The fuel cell block according to claim 1, wherein:
said fuel cells include a first fuel cell;
said operating gas feed line conveys operating gas in a flow direction; and
said condensation separator is fluidically connected to said operating gas feed line upstream of said first fuel cell with respect to said flow direction.

6. The fuel cell block according to claim 1, wherein said condensation separator has a gas block.

7. The fuel cell block according to claim 1, including a water collection vessel fluidically connected to said condensation separator.

8. The fuel cell block according to claim 1, including an operating gas discharge line fluidically connected to said condensation separator.

9. The fuel cell block according to claim 1, wherein said operating gas feed line has a condensation barrier.

10. The fuel cell block according to claim 5, wherein said operating gas feed line has a condensation barrier.

11. The fuel cell block according to claim 10, wherein said condensation barrier is disposed between said condensation separator and said first fuel cell.

12. The fuel cell block according to claim 1, wherein:
said operating gas feed line has a condensation barrier;
at least one of said fuel cells has a thermal component; and
said condensation barrier is a metal sheet of said thermal component.

13. The fuel cell block according to claim 3, wherein:
said operating gas feed line has a condensation barrier; and
said condensation barrier is a metal sheet of said thermal component.

14. The fuel cell block according to claim 1, wherein at least one of said fuel cells has a thermal component with a metal sheet forming a condensation barrier in said operating gas feed line.

15. The fuel cell block according to claim 12, wherein said condensation barrier is disposed between said condensation separator and said fuel cells.

16. The fuel cell block according to claim 1, wherein:
said operating gas feed line conveys operating gas in a flow direction;
said condensation separator is disposed upstream of said fuel cells with respect to said flow direction; and
a condensation barrier is disposed between said condensation separator and said fuel cells.

17. The fuel cell block according to claim 1, wherein at least one of said fuel cells is a PEM fuel cell.

18. The fuel cell block according to claim 1, wherein said fuel cells are PEM fuel cells.

19. The fuel cell block according to claim 1, wherein said operating gas feed line is fluidically connected to at least one of said fuel cells.

20. The fuel cell block according to claim 5, wherein said operating gas feed line is fluidically connected to at least said first fuel cell.

21. The fuel cell block according to claim 8, wherein said operating gas discharge line is fluidically connected to at least one of said fuel cells.

22. A fuel cell block, comprising:
fuel cells disposed in a fuel cell stack;
an operating gas feed line fluidically connected to at least one of said fuel cells;
a plate-shaped component having a condensation separator fluidically connected to said operating gas feed line for removing condensation from said operating gas feed line before the condensation passes into said fuel cells, said component being integrated in said fuel cell stack; and
a condensation barrier disposed between said condensation separator and at least one of said fuel cells.

* * * * *